June 5, 1956  W. W. McNABB  2,748,523
NON-SPINNING LURE
Filed Oct. 21, 1952
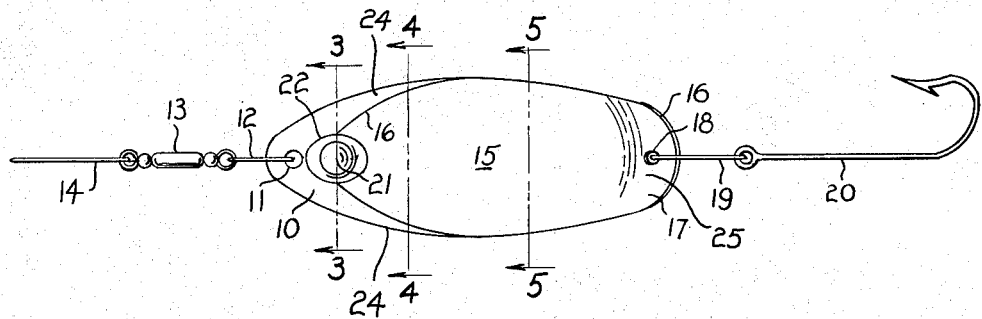
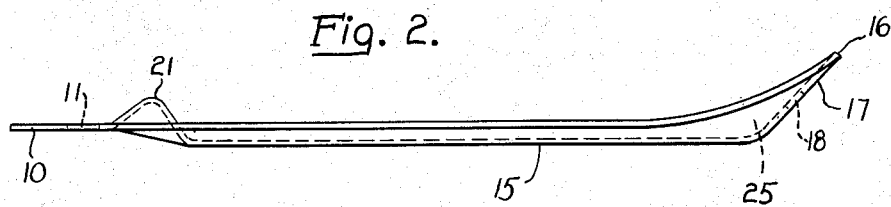
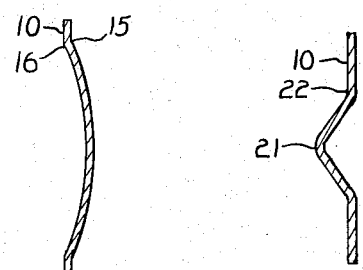 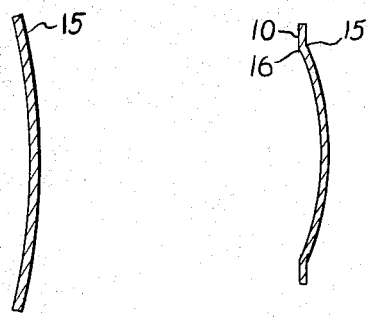
INVENTOR.
WILLIS W. McNABB
BY
Cook and Schermerhorn
ATTORNEYS

United States Patent Office 2,748,523
Patented June 5, 1956

2,748,523
NON-SPINNING LURE

Willis W. McNabb, Brookings, Oreg.

Application October 21, 1952, Serial No. 315,863

1 Claim. (Cl. 43—42.5)

This invention relates generally to fishing tackle and particularly to a non-spinning lure.

It is a matter of common knowledge that lures have long been made to attract fish by offering a spinner object which causes the fish to strike. Such devices have their disadvantages as well as their advantages, not the least of which is the difficulty in holding them at a fixed depth at different trolling speeds and stream conditions.

It is the main object of my invention to provide a lure which will move in a vertical plane and which will offer a wiggler action at the tail or hook end thereof.

The second object is to provide a lure with a aileron on its leading end whereby the action of the lure is positively controlled.

I accomplish these and other objects in the manner set forth in the following specifications as illustrated by the accompanying drawings, in which Fig. 1 is a plan elevation of the lure.

Fig. 2 is a side view of the lure.

Fig. 3 is a transverse section taken along the line 3—3 in Fig. 1.

Fig. 4 is a transverse section taken along the line 4—4 in Fig. 1.

Fig. 5 is a transverse section taken along the line 5—5 in Fig. 1.

Like numbers of reference refer to the same or similar parts throughout the several views.

Referring in detail to the drawing there is shown a somewhat oval form of lure having a large trailing end and a smaller leading end so as to assume generally the outline of the fore part of a fish in which the head end 10 is of flat metal and is provided with a hole 11 for receiving the ring 12 which is joined by the swivel coupling 13 to a leader 14. The body 15 has a transverse concavo-convex configuration along the major portion of its length as shown in Figs. 4 and 5, which merges into the flat area 10 along the line 16. The concavo-convex portion has side rims 24 in a common plane with said flat end which extends along the major portion of the length of the lure. The convex side is straight longitudinally of the lure from the bottom of the bump 21 to a point near the trailing end.

The rims of the lure at the tail end 16 are curved gradually upwardly and form with the bottom a dished portion or deep recess 25 which is provided with a hole 18 joined by a ring 19 to the hook 20, the lure being imperforate except for the holes 11 and 18. The rear side of the recess 25 forms an acute angle with the adjacent rim portion.

At the forward end 10 along the center line of the lure and at the line 16 is a raised bump 21 which is formed on the concave side of the lure near the normal gill position. The summit of the bump 21 is round while its base 22 is somewhat elliptical. The leading edge of the bump 21 intersects the flat end 10 slightly to the rear of the hole 11 and the trailing edge of the bump intersects the concave portion.

The bump 21 provides a stabilizing action holding the lure to a fixed depth and vertical plane while the turned edge 17 imparts a slight wiggling action.

A lure so constructed will move close to the surface of the water without turning but with a slight wiggling motion at its tail end and without any tendency to dive or jump out of the water at varying boat or water speeds or direction of travel.

I claim:

A lure of elongated oval outline having a large trailing end and a smaller leading end, said lure having a transverse concavo-convex configuration along the major portion of its length extending from the larger trailing end to a short distance from its leading smaller end, said leading end being flat and said concavo-convex portion having side rims in a common plane with said flat end and extending along the major portion of the length of the lure, the small flat end having a bump formed along its median line at its junction with the concave portion, the convex side of the lure being straight longitudinally of the lure from the bottom of said bump to a point near the trailing end of the lure, the rearward portion of the lure rim curving gradually upward to form with the bottom a deep recess at the trailing end of the lure, the rear side of said recess forming an acute angle with relation to the adjacent rim portion, the opposite ends of said lure having holes formed therein for the attachment of a hook and leader, said lure being imperforate except for said hook and leader attachment holes, the leading edge of said bump intersecting said flat end slightly to the rear of said leader hole and the trailing edge of said bump intersecting said concave portion.

References Cited in the file of this patent

UNITED STATES PATENTS

| | | |
|---|---|---|
| 1,422,457 | McClanahan | July 11, 1922 |
| 1,471,280 | Reekers | Oct. 16, 1923 |
| 2,206,789 | Nelson | July 2, 1940 |
| 2,507,772 | Cummins | May 16, 1950 |
| 2,554,216 | Scott | May 22, 1951 |